United States Patent
Taaghol et al.

(10) Patent No.: US 8,094,651 B2
(45) Date of Patent: Jan. 10, 2012

(54) EMERGENCY CALL SERVICES FOR WIRELESS NETWORK ROAMING

(75) Inventors: Pouya Taaghol, San Jose, CA (US);
Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 12/130,358

(22) Filed: May 30, 2008

(65) Prior Publication Data
US 2008/0311881 A1 Dec. 18, 2008

Related U.S. Application Data

(60) Provisional application No. 60/944,064, filed on Jun. 14, 2007.

(51) Int. Cl.
*H04L 12/66* (2006.01)
(52) U.S. Cl. .............. 370/352; 455/404.1; 455/466; 455/435.2
(58) Field of Classification Search .............. 370/352, 370/310, 328; 455/404.1, 466, 435.2
See application file for complete search history.

(56) References Cited

U.S. PATENT DOCUMENTS
7,003,555 B1 2/2006 Jungck
7,372,827 B2 5/2008 Suwa
2007/0100998 A1 5/2007 Ramadan et al.
2007/0254661 A1 11/2007 Chowdhury et al.
2010/0303064 A1* 12/2010 Bari .............................. 370/352

OTHER PUBLICATIONS

Non-Final Office Action for U.S. Appl. No. 12/128,892 mailed Mar. 3, 2011, 9 pgs.
"First Report and Order and Notice of Proposed Rulemaking", Federal Communications Commission, May 19, 2005, 91 pages.
"Part 16: Air Interface for Fixed and Mobile Broadband Wireless Access Systems", Amendment 2: Physical and Medium Access Control Layers for Combined Fixed and Mobile Operation for Licensed Bands, IEEE, 2006, 864 pages.
"Series E: Overall Network Operation, Telephone Service, Service Operation and Human Factors", International operation—Numbering plan of the international telephone service, ITU-T Recommendation E. 164—Supplement 4, May 2003, 18 pages.
Aboba, B., et al., "Extensible Authentication Protocol (EAP)", The Internet Society, Jun. 2004, 68 pages.
Final Office Action mailed Jul. 6, 2011 for U.S. Appl. No. 12/128,892.

* cited by examiner

*Primary Examiner* — Phuoc Doan
(74) *Attorney, Agent, or Firm* — Blakely, Sokoloff, Taylor & Zafman LLP

(57) ABSTRACT

A method and apparatus for emergency call services for wireless network roaming. An embodiment of a method includes receiving a request for an emergency telephone call from a mobile device, the mobile device communication over the Internet, the mobile device roaming in a visited wireless network when the emergency call is made. The method further includes establishing a session for an emergency services call and connecting the mobile device to emergency services.

20 Claims, 6 Drawing Sheets

EMERGENCY CALL SERVICES FOR WIRELESS NETWORK ROAMING

RELATED APPLICATIONS

This application claims the benefit of U.S. Provisional Application 60/944,064, filed Jun. 14, 2007.

FIELD

Embodiments of the invention relate to telephone communications. More particularly, embodiments of the invention relate to emergency call services for wireless network roaming.

BACKGROUND

The merging of computer and telephone communications has become widespread quickly. For example, Voice over IP (VoIP) is often used to connect telephone communications over Internet connections.

In connection with this, the implementation of VoIP or similar technologies in wireless network operation may be developed, thereby merging these technologies in telephone operations. In such an environment, a mobile user may be allowed to communicate in various wireless networks in the same manner as conventional cellular and other wireless telephone technologies, with the communications of the mobile user being transmitted over the Internet via the wireless connection.

However, the use of Internet communications may result in certain telephone service requirements for those operating in wireless communications networks. For example, in wireless operation, mobile users may roam into other networks, and, while roaming, the mobile users may require emergency call services. Regulations in most nations require support for emergency services in communication operations, such as providing services to allow for making calls to emergency centers for police, fire, medical, and other services, and providing services to allow for locating mobile users who call for emergency services.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

An embodiment of the invention concerns emergency call services for wireless network roaming.

In an embodiment of the invention, emergency services are provided to a user of a mobile device, with the user utilizing VoIP in a wireless network while roaming outside of a home network for the user. In an embodiment, telephone communications may be provided over any wireless communications network utilizing cells. For example, the wireless network may be a Worldwide Interoperability for Microwave Access (WiMAX) network.

WiMAX is defined by standards available from the WiMAX Forum, formed in June 2001 to promote conformance and interoperability of the IEEE 802.16 standard, officially known as WirelessMAN (Wireless Metropolitan Area Network). IEEE 802.16 corresponds to IEEE 802.15-2005 entitled "Air Interface for Fixed Broadband Wireless Access Systems" approved Dec. 7, 2005 as well as related standards and documents. Other wireless network protocols may also be supported including, for example, Time Division, Multiple Access (TDMA) protocols, Global System for Mobile Communications (GSM) protocols, Code Division, Multiple Access (CDMA) protocols, and/or any other type of wireless communications protocol. In an embodiment of the invention, the VoIP over the wireless connection may be hosted by a wireless network operator (such as a WiMAX service network provider), by a third party application service provider (ASP), or in any other manner.

In an embodiment of the invention, a wireless subscriber, such as a WiMAX network subscriber, may make an emergency call when the subscriber is roaming in a visited network, rather than being in the home network. In an embodiment of the invention, a network provides for commencement of emergency call services both when a mobile device is authenticated and when a mobile device has not yet been authenticated. This process allows the mobile device user to obtain emergency services without waiting for completion of authentication services. In an embodiment, a user who is seeking emergency services without authentication is allowed to make an emergency call, but is prevented from utilizing any other services on the network without authorization. In this manner, emergency services are provided as needed to roaming users without allowing the emergency service operation to provide illicit access to the network by a non-authenticated user.

Figure 1:
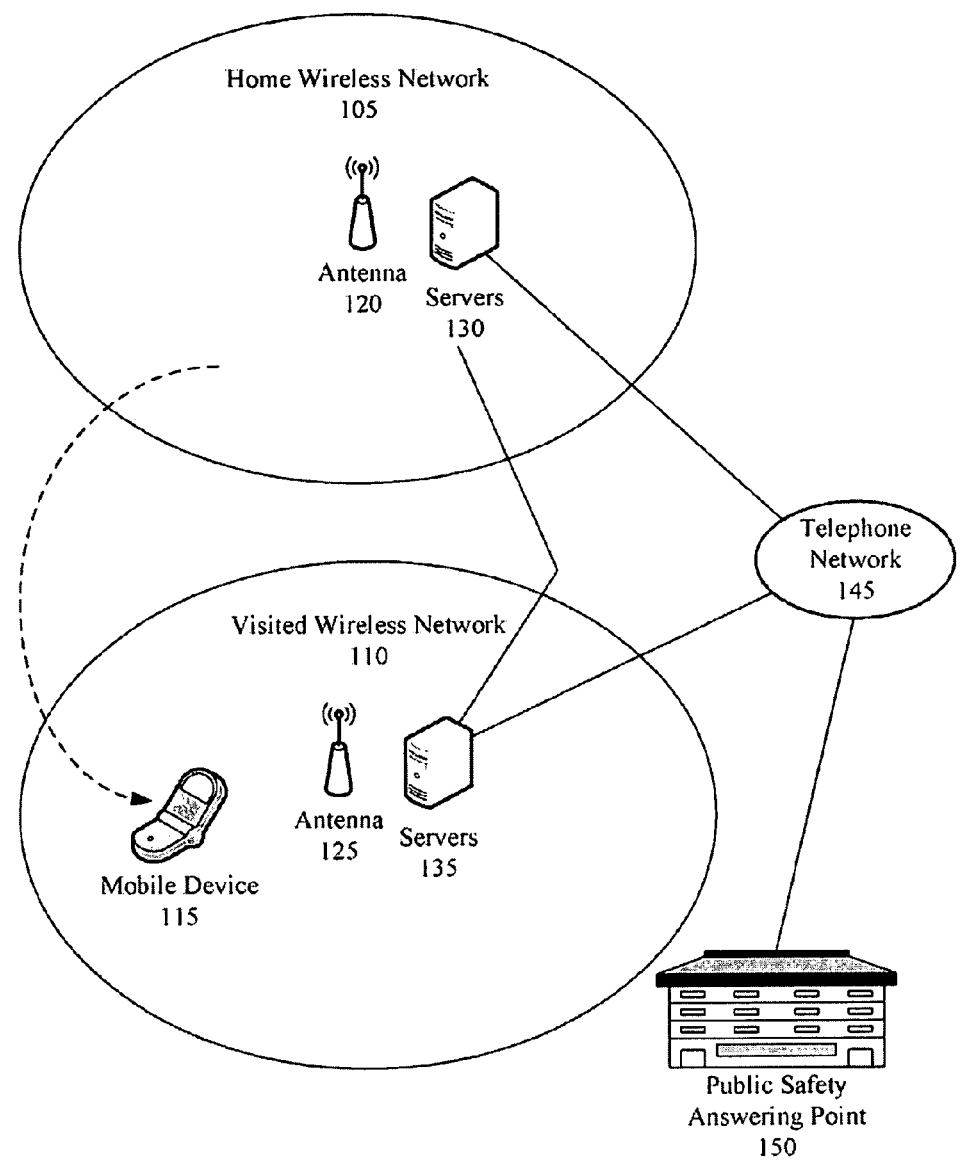
FIG. 1 is an illustration of an embodiment of emergency call services for a mobile device roaming in a wireless network.

FIG. 1 is an illustration of an embodiment of emergency call services for a mobile device roaming in a wireless network. In this illustration, a mobile device or station 115 operates via a wireless network. The mobile 115 device may be any type of station or device is capable of connecting to the wireless network and utilizing telephone service. The wireless network may include, but is not limited to, a WiMAX network. In this illustration, the mobile device 115 has a home wireless network 105, but may be roaming in a visited wireless network 110. The connections to such wireless networks are illustrated for simplicity as WiMAX network antennas 120 and 125 and one or more servers 130 and 135, but there may be any number and type of wireless connections. The wireless device 115 may connect to a telephone network 145, such as via VoIP technology.

While roaming in the visited service network 110, the user of the mobile device 115 may encounter an emergency, and may attempt to obtain emergency call services from the visited wireless network 110. In some embodiments, the visited wireless network 110 provides emergency call services to the mobile device 115 both in circumstances in which the mobile device 115 has been authenticated in the visited wireless network 110 and in circumstances in which the wireless device has not been authenticated. In some embodiments, the visited network 110 provides emergency call services for a non-authenticated user, but filters data for non-emergency services.

In some embodiments, the visited wireless network 110 may obtain the location of the mobile device 115, with the determination of location being via any known location determination method. Based at least in part on the location of the mobile device, the visited network connects the mobile device 115 to a nearby public safety answering point (PSAP) 150. The PSAP 150 is a physical location where emergency calls from the public are received. The user of the mobile device 115 then can communicate with PSAP 150 to address the emergency circumstances. However, the mobile device 115 would not be capable of obtaining non-emergency services without authentication of the mobile device 115 by the visited wireless network 110.

Figure 2:
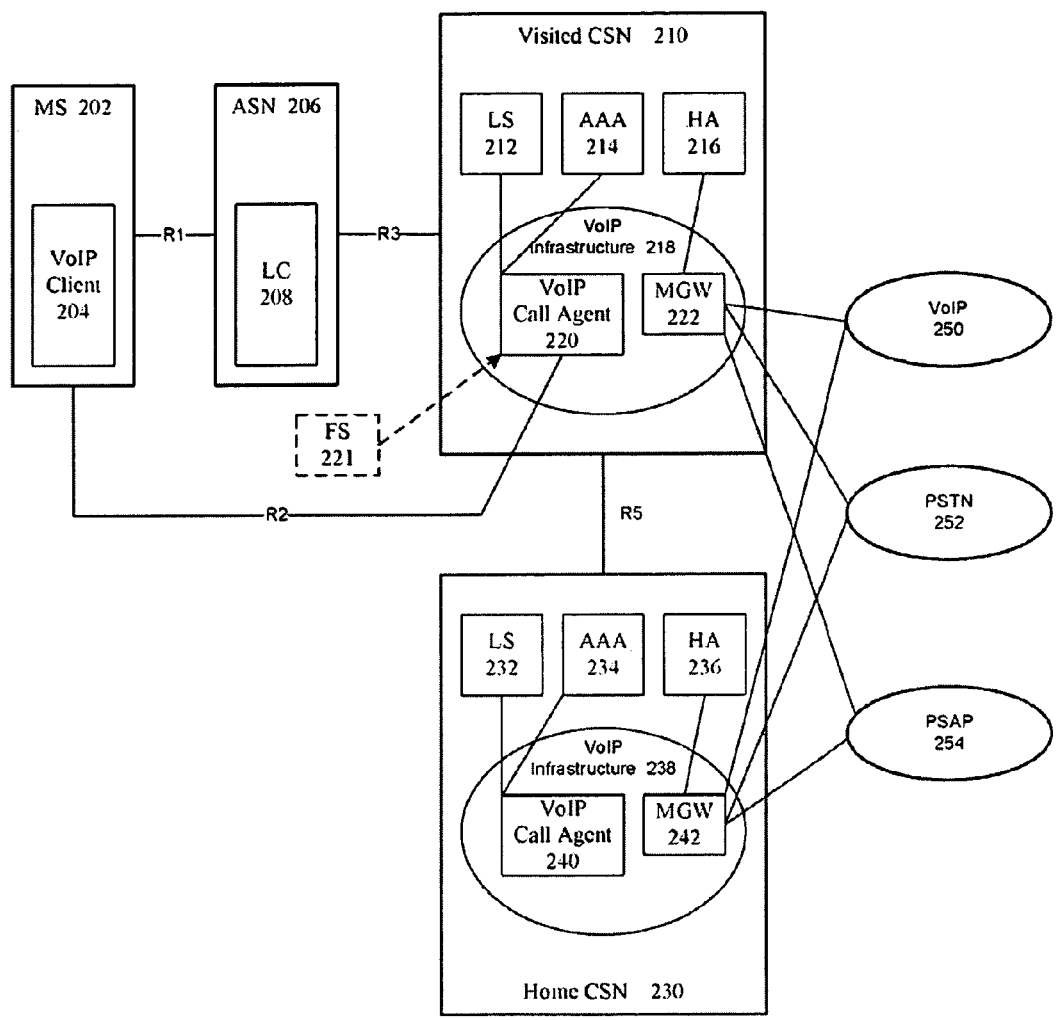
FIG. 2 is an illustration of an embodiment of an architecture for VoIP emergency services (ES) support in roaming operations.

FIG. 2 is an illustration of an embodiment of an architecture for VoIP emergency services (ES) support in roaming operations. The network may include a mobile station 202, the mobile station 202 including a VoLP client 204, the mobile station 202 being linked (via link R1) to an access service network (ASN) 206 and (via link R2) to a visited connectivity service network (CSN) 210. The ASN 206 is coupled with the visited CSN 210 via link R3. The visited CSN 210 then is linked to a home CSN 230 for the mobile station 202 via link R5. The CSNs may access other VoIP networks 250 and the PSTN (Public Switched Telephone Network) 252, and may access a public safety answering point (PSAP) 254 for the provision of emergency services.

To provide emergency services, location determination may be needed. In order for a mobile station to access and be reached from a PSTN 252 for incoming PSTN calls and emergency call back, the mobile station 202 is required to have an MSISDN (Mobile Station Integrated Services Digital Network) number (as defined by the E.164 ITU-T recommendation, which defines the international public telecommunication numbering plan used in the PSTN and some other data networks). In an embodiment, the MSISDN number may be used in conjunction with location operations. In an embodiment, in order to enable determination of location position for a mobile station 202, the ASN 206 includes a "Location Controller" (LC) function 208. Further, each CSN is includes a "Location Server" (LS), LS 212 for the visited CSN 210 and LS 232 for the home CSN. Each CSN includes a home agent (HA) 216 and 236. In an embodiment, the architecture further includes a network element, referred to as a "Call/VoIP agent" or "call agent" (call agent 220 for the visited CSN 210 and call agent 240 for the home CSN 230) within a VoIP infrastructure (infrastructure 218 for the visited CSN 210 and infrastructure 238 for the home CSN 230), the call agent being responsible for providing control level communication with the mobile station 202 There may be additional call servers (not shown here) utilized in emergency call setup acting in proxy mode.

The user of a mobile station 202 may attempt to initiate an emergency call. In an embodiment, the call agent 220 of the visited CSN 210 communicates with the location server 212 to locate the mobile station 202 at the emergency call set up. The call agent 220 operates as the edge border of VoIP infrastructure 218 for the mobile station 202, and a media gateway (MGW) (MGW 222 for the visited CSN 210 and MGW 242 for the home CSN 230) is the VoIP edge for public switched telephone networks (PSTN) 252, other VoIP networks 250, and the Public Safety Answering Point (PSAP) 254. The call agent 220 can communicate with an AAA (Authentication, Authorization and Accounting) server 214 (AAA 234 for the Home CSN 230) to authorize the emergency service if it is required. (In some nations, emergency service denial by the service provider may be authorized in certain circumstances.) Voice supplementary services can be offered by a Feature Server 221 that is optionally implemented in the Call Agent 220. The location server 212 may communicate with the PSAP 254 if continuous location monitoring of the user of the mobile station 202 is required.

As provided in FIG. 2, when the mobile station is roaming there are two relevant CSNs—the visited CSN 210 and the home CSN 230. In an embodiment of the invention, for simplicity and latency reasons the mobile station 202 will generally attempt to contact the VoIP call agent 220 in the visited CSN where it is currently roaming. In an embodiment of the invention, the mobile station 202 may discover the VoIP call agent 220 in the visited CSN using DHCP (Dynamic Host Configuration Protocol) or other known discovery procedures. Such procedures are beyond this description and are not described in depth herein. Once the call agent 220 in the visited CSN 210 has been discovered, the mobile station may make its emergency call through that call agent 220 (as opposed to the VoIP call agent 240 in the home CSN 230) for at least the following reasons:

(a) It is quicker for the mobile station 202 to access through the visited CSN 210 than through the home CSN 230; and (b) The visited CSN 210 may be expected to know the nearest PSAP to the mobile station 202 based on the mobile station location, which will provide more effective emergency services to the user.

There are at least two scenarios in which a mobile station may make an emergency call when the mobile station is roaming:

(a) The mobile station is making an emergency call from an unauthenticated state, such as when the mobile station does not have coverage with the home network operator and urgently needs to make the emergency call. This may be expected to be a common scenario—an emergency call would often be made by switching on a mobile device and immediately attempting to receive emergency help.

(b) The mobile station is making an emergency call after it is fully authenticated by the visited CSN, such as when the mobile station is in session with the visited CSN.

In an embodiment of the invention, a network provides for commencement of emergency call services when a mobile device has not yet been authenticated, as well as when the device has been authenticated. This allows the mobile device user to obtain emergency services without waiting for completion of authentication services, or when authentication is not possible.

Figure 3:
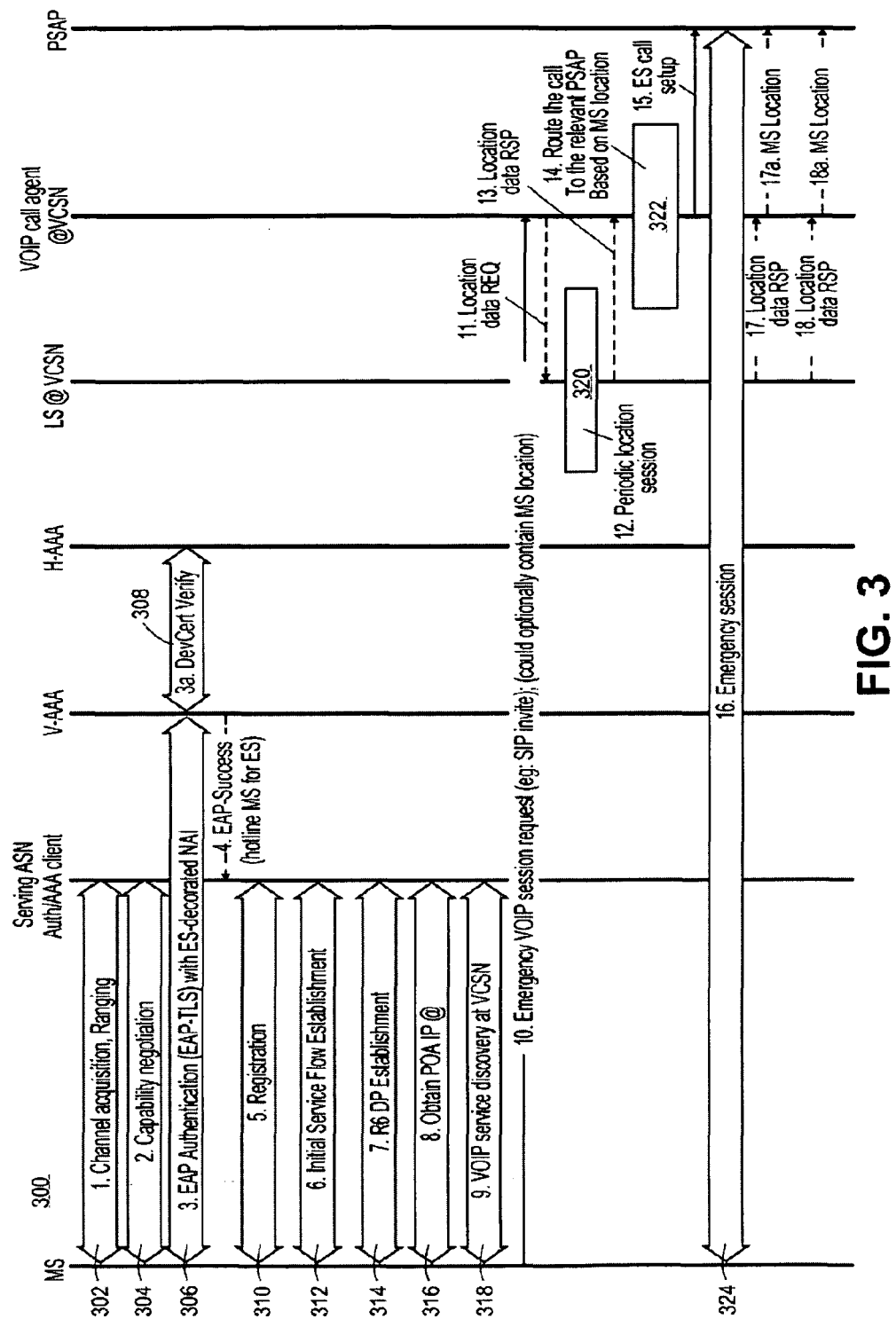
FIG. 3 is an illustration of embodiments of processes to support emergency services over a wireless network for an unauthenticated mobile station or device.

FIG. 3 is an illustration of embodiments of processes to support emergency services over a wireless network, such as WiMAX, for an unauthenticated mobile station or device. In such a process, the mobile station may commence with channel acquisition and ranging 302 and capability negotiation with the serving ASN (access service network) 304. This may be followed by EAP (Extensible Authentication Protocol) authentication (EAP-TLS-Transport Layer Security) 306 with the AAA server of the visited CSN and verification of the device certificate (DevCert) of the mobile station with the AAA server of the home CSN 308. The mobile station making an emergency service request may use a decorated NAI (Network Address Identifier) for emergency calls (for example, ES|device-ID@wimax.org). The mobile station is not expected to have valid user credentials at this point in the process (as in circumstances in which the mobile device is turned on for purposes of making an emergency call). For this reason, the mobile station presents the decorated device certificate NAI to the visited network. In this process, the mobile station is presenting this NAI to the Visited AAA for authentication, and the Visited AAA can further contact the home AAA to authenticate the mobile station for emergency services. Once the visited AAA authenticates the device certificate for the mobile station, the visited AAA sends a hotline command to the serving ASN to ensure that the mobile station at this point may only make emergency calls and not make use of any other services or other types of access in the visited network. The hot-lining will be done at the serving ASN-GW (ASN gateway), which will drop all the packets not destined to the VoIP infrastructure and using the VoIP port of the UDP (User Datagram) protocol.

The mobile station is then registered 310 and there is an initial service flow established 312 and R6 DP established 314. The IP address is obtained by the mobile station, with the IP address being from the Visited network 316. VoIP service discovery then commences at the visited CSN 318. The mobile station makes the Emergency VoIP call. If the mobile station attempts to take any other action, the mobile station data will be dropped at the serving ASN-GW. As part of this VoIP call initiation, the mobile station may include its location in the event the mobile station has standalone location determination capability, such as GPS (Global Positioning System) or other systems. The VoIP call agent may start a periodic location session with the location server at the VCSN (Visited Connectivity Service Network) 320. Based on the location of the MS, the VoIP call agent routes the emergency services call to the nearest PSAP 322. The location server periodically updates the MS location to the VoIP call agent, which may relay it to the PSAP. The emergency session is then conducted 324.

Figure 4:
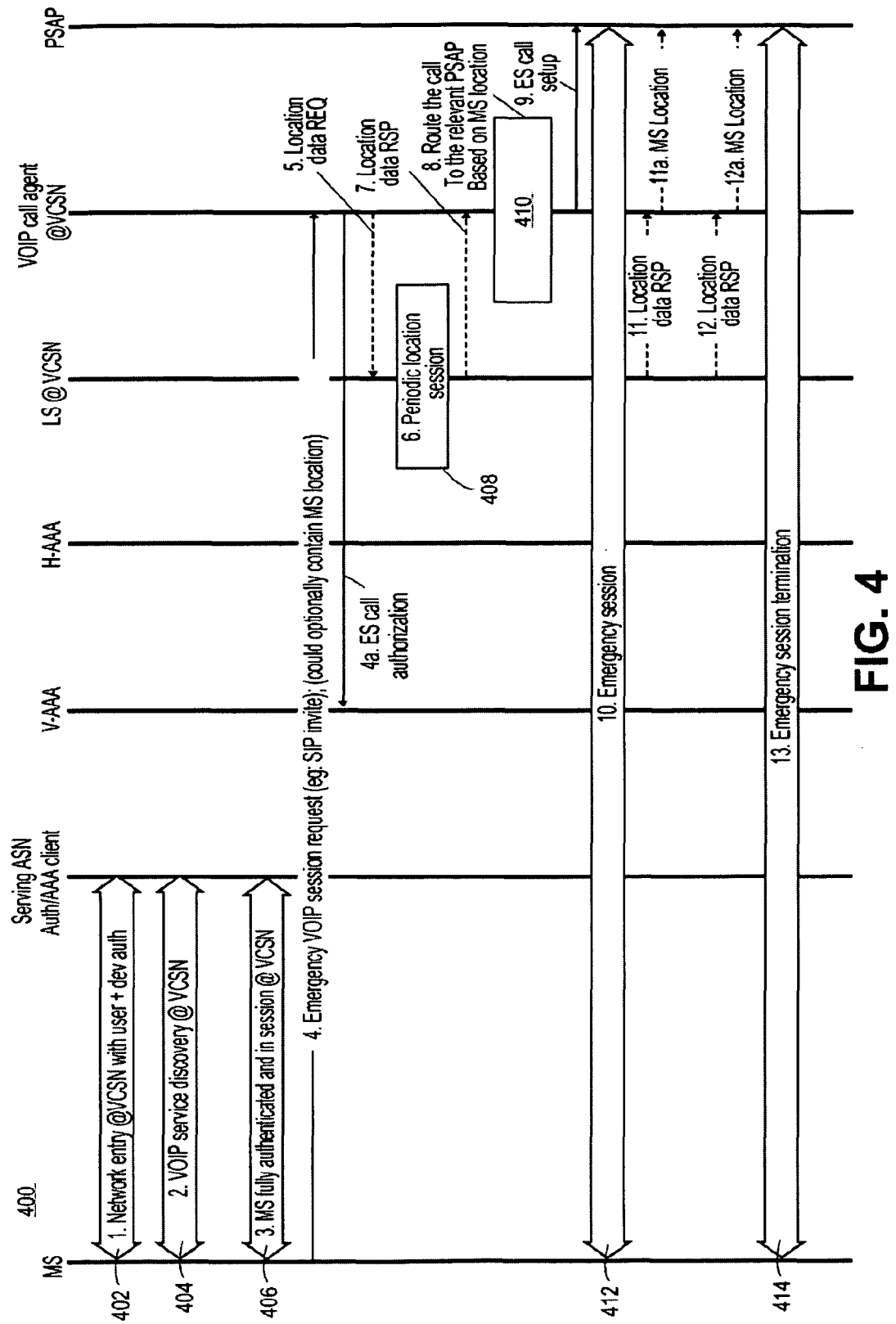
FIG. 4 is an illustration of embodiments of processes for provision of emergency services for an authenticated mobile device.

FIG. 4 is an illustration of embodiments of processes for provision of emergency services for an authenticated mobile device. In this illustration, a mobile station attempts to make an emergency services call after it is fully authenticated by the visited CSN, i.e., makes a mid-session emergency call. In an embodiment of the invention, an emergency call shares some characteristics of a non-roaming scenario emergency services call, but requires roaming operations.

In an embodiment of the invention, there is network entry at the visited CSN with the user device authentication 402. In an embodiment, the mobile station has obtained its IP address from the visited (roaming) network.

In an embodiment of the invention, the mobile station discovers the VoIP service in the visited network 404, as was provided above for a non-authenticated roaming ES call. The mobile station is fully authenticated in the session with the visited CSN 406. In an embodiment, the MS is not hot-lined for emergency services calls, as it is fully authenticated and thus this is not necessary. Once the VoIP service is discovered, the mobile station will contact the VoIP call agent in the Visited network to initiate the mid session emergency services call. The VoIP call agent may contact the V-AAA to authorize the mobile station for the emergency services call as required by regulations in some countries. Location data may be requested, and there may be a periodic location session to maintain the location data 408. The call is routed to a closely located PSAP based on the location of the mobile station 410. The mobile station then makes the emergency VoIP call 412. The location of the mobile station may be updated and maintained during the emergency call until the emergency session termination 414.

Figure 5:
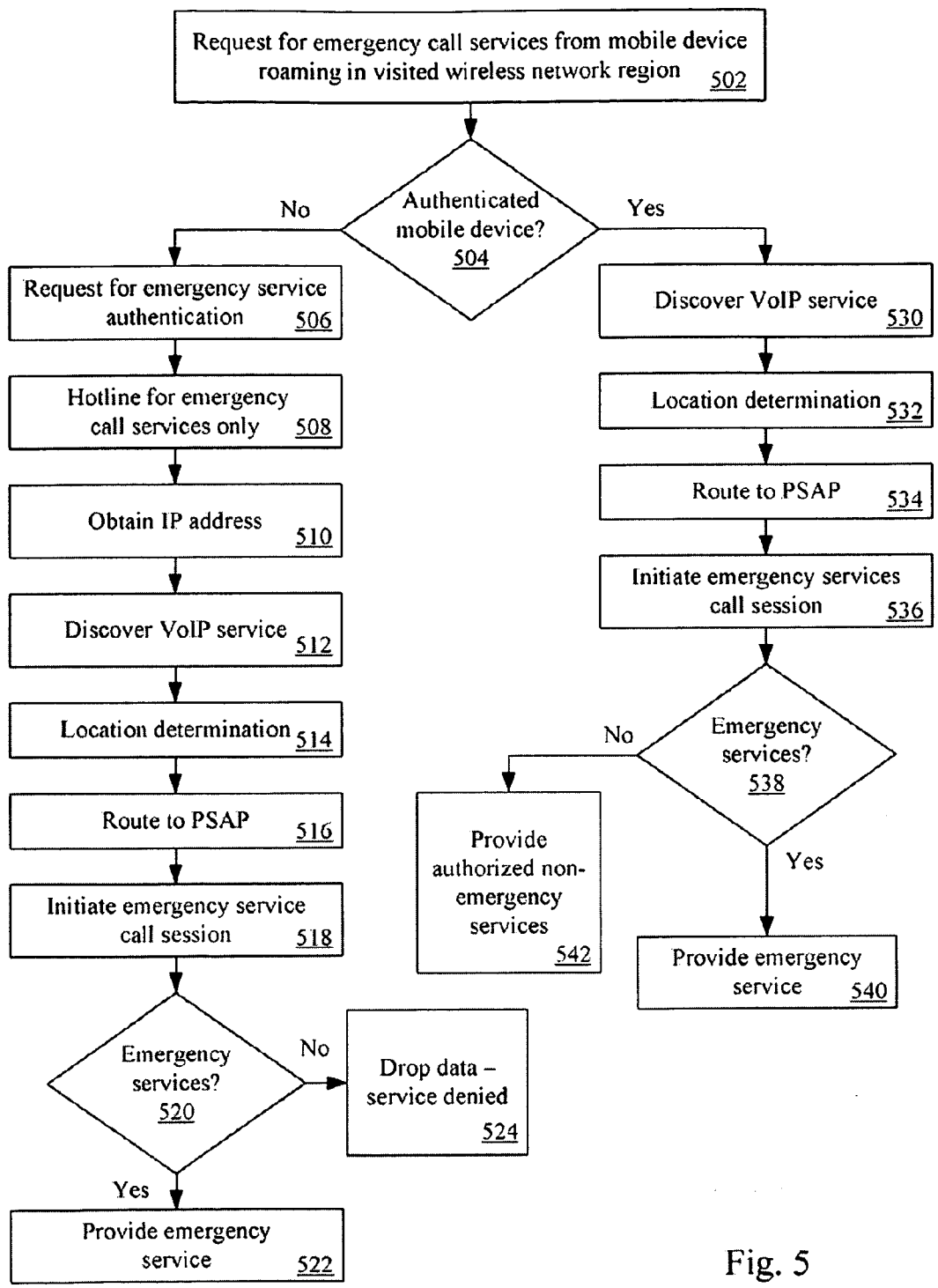
FIG. 5 is a flowchart to illustrate an embodiment of a process for provision of emergency call services for a mobile device roaming in a wireless network.

FIG. 5 is a flow chart to illustrate an embodiment of a process for providing emergency services for a mobile device that is roaming in a wireless network. In some embodiments, a request may be received from the mobile device while roaming a visited wireless network or wireless network region 502.

If the mobile device has not been authenticated by the wireless network 504, then a request is received from the mobile device for emergency service authentication 506. In some embodiments, a hotline is established for emergency call services only 508. An IP (Internet Protocol) address is obtained for the mobile device 510, and the VoIP service is discovered at the visited wireless network 512. In some embodiments, the location of the mobile device may be established 514, which may then be periodically updated. Based at least in part on the location, the call from the mobile device is routed to a nearby PSAP 516. In some embodiments, an emergency service call session is then initiated 518. If the mobile device utilizes emergency services 520, the services are provided 522. However, if the mobile device attempts to utilize non-emergency services 520, the data from the will be dropped and the requested service will be denied 524.

If the mobile device has been authenticated in the visited wireless network 504, then there is no need to authenticate the device. In some embodiments, the VoIP service is discovered at the visited wireless network 530. In some embodiments, the location of the mobile device may be established 532, which then may be periodically updated. Based at least in part on the location, the call from the mobile device is routed to a nearby PSAP 534. In some embodiments, an emergency service call session is then initiated 536. If the mobile device utilizes emergency services 538, the services are provided 540. If the mobile device attempts to utilize non-emergency services 538, any authorized non-emergency services will be provided as normal for an authenticated device 542.

Figure 6:
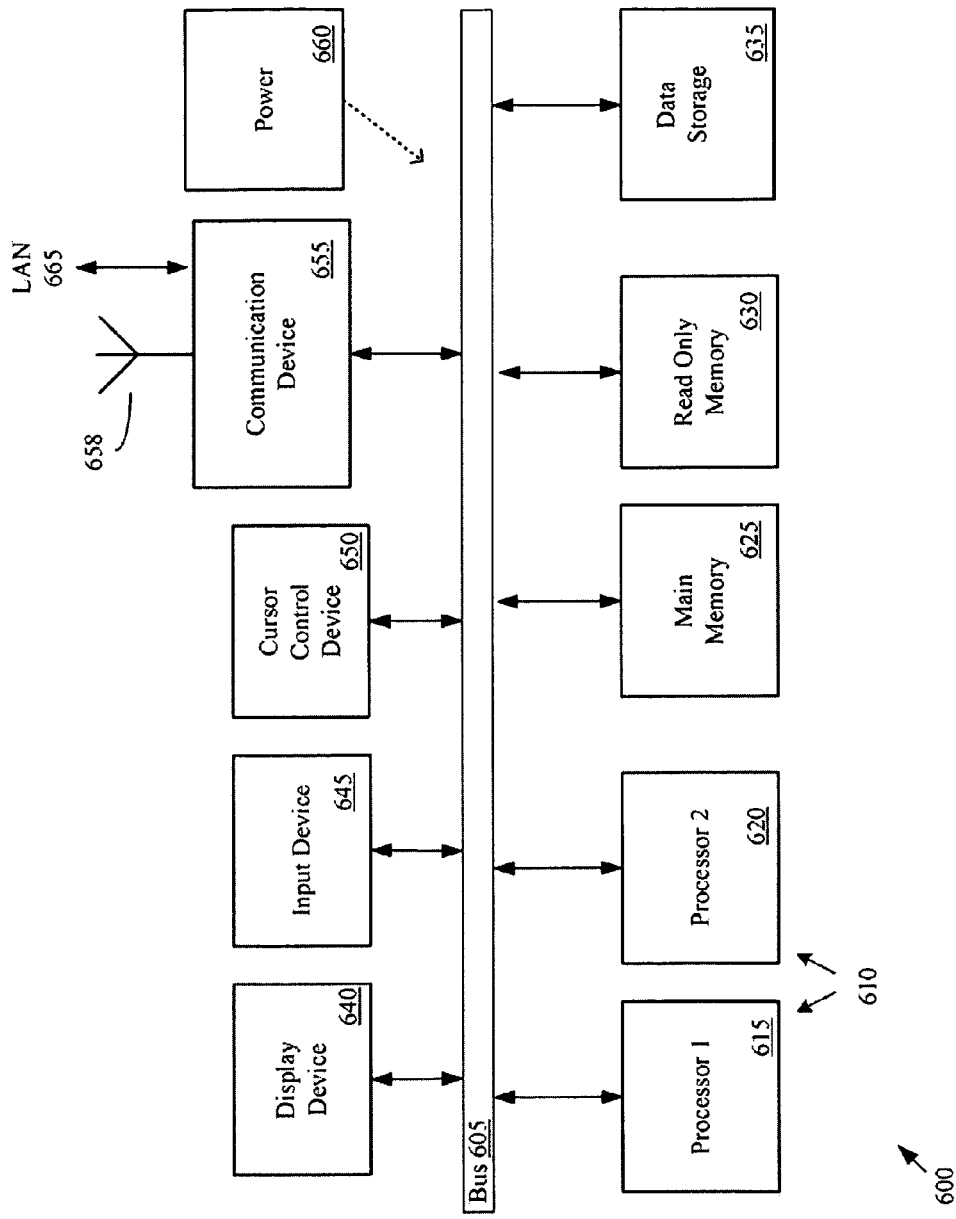
FIG. 6 is an illustration of a computer system that may be utilized an embodiment of the invention.

FIG. 6 is an illustration of a computer system that may be utilized an embodiment of the invention. The computer system may include, but is not limited to, a network server for a wireless communication network. Certain standard and well-known components that are not germane to the present invention are not shown. Under an embodiment of the invention, a computer 600 comprises a bus 605 or other communication means for communicating information, and a processing means such as two or more processors 610 (shown as a first processor 615 and a second processor 620) coupled with the bus 605 for processing information. The processors 610 may comprise one or more physical processors and one or more logical processors. Further, each of the processors 610 may include multiple processor cores. The computer 600 is illustrated with a single bus 605 for simplicity, but the computer may have multiple different buses and the component connections to such buses may vary. The bus 605 shown in FIG. 6 is an abstraction that represents any one or more separate physical buses, point-to-point connections, or both connected by appropriate bridges, adapters, or controllers. The bus 605, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In an embodiment of the invention, the processors 610 may be utilized to support one or more virtual machines. In an embodiment of the invention, the computer 600 further comprises a random access memory (RAM) or other dynamic storage device as a main memory 625 for storing information and instructions to be executed by the processors 610. Main memory 625 also may be used for storing temporary variables or other intermediate information during execution of instructions by the processors 610. The main memory 625 may include pages for a protected agent, which may be swapped out to secondary and swapped back to the main memory. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The uses of the main memory may include the storage received signals from wireless devices. The computer 600 also may comprise a read only memory (ROM) 630 and/or other static storage device for storing static information and instructions for the processors 610.

Data storage 635 may also be coupled to the bus 605 of the computer 600 for storing information and instructions. The data storage 635 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 640, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 640 may be or may include an audio device, such as a speaker for providing audio information. An input device 645 may be coupled to the bus 605 for communicating information and/or command selections to the processors 610. In various implementations, input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

A communication device 655 may also be coupled to the bus 605. Depending upon the particular implementation, the communication device 655 may include a transceiver, a wireless modem, a network interface card, LAN (Local Area Network) on motherboard, or other interface device. The uses of a communication device 655 may include reception of signals from wireless devices. For radio communications, the communication device 655 may include one or more antennas 658. In one embodiment, the communication device 655 may include a firewall to protect the computer 600 from improper access. The computer 600 may be linked to a network, such as LAN (local area network) 665, or to other devices using the communication device 655, which may include links to the Internet, a local area network, or another environment. The computer 600 may also comprise a power device or system 660, which may comprise a power supply, a battery, a solar cell, a fuel cell, or other system or device for providing or generating power. The power provided by the power device or system 660 may be distributed as required to elements of the computer 600.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product.

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
receiving a request for an emergency telephone call from a mobile device at an access service network of a visited wireless service network, the mobile device roaming in the visited wireless service network when the emergency call is made, the visited wireless service network including a Voice over Internet Protocol (VoIP) infrastructure having a call agent, wherein the mobile device has not been authenticated by the visited wireless service network when the emergency call is made;

authenticating a device certificate for the mobile device;

determining a location of the mobile device;

establishing a session for an emergency services call with the mobile device; and connecting the mobile device to emergency services, wherein the call agent chooses the emergency service based at least in part on the location of the mobile device, and wherein the access service network prevents the mobile device from utilizing network services other than emergency services.

2. The method of claim 1, wherein refusing any services to the mobile device other than emergency services includes dropping all packets not directed to the VoIP infrastructure.

3. The method of claim 1, further comprising obtaining an Internet address for the mobile device.

4. The method of claim 1, further comprising discovering VoIP services for the mobile device at the visited wireless service network.

5. The method of claim 1, wherein determining the location of the mobile device includes the call agent communicating with a location server.

6. The method of claim 1, wherein connecting the mobile device to emergency services comprises the call agent connecting the mobile device to a public safety answering point (PSAP).

7. The method of claim 1, wherein the visited wireless service network is a WiMAX (Worldwide Interoperability for Microwave Access) network.

8. The method of claim 1, wherein the call agent is discovered by the mobile device.

9. The method of claim 1, wherein the VoIP call agent is responsible for providing control level communication with the mobile device.

10. A wireless network comprising:
an access service network to receive a request for an emergency telephone call from a mobile device that is roaming outside of a home network, wherein the mobile device has not been authenticated by the wireless network;
an authentication server, the authentication server to authenticate devices a device certificate of the mobile device for emergency call services; and
a Voice over Internet Protocol (VoIP) infrastructure to provide a connection to a telephone service, wherein the VoIP infrastructure includes a VoIP call agent;
wherein the wireless network is to provide emergency call services to the mobile device, the provision of emergency call service including the VoIP call agent connecting the mobile device to an emergency center over the VoIP infrastructure;
wherein the VoIP call agent chooses the emergency center based at least in part on a location of the mobile device, and wherein the access service network prevents the mobile device from utilizing network services other than emergency services.

11. The wireless network of claim 10, wherein the access service network is to provide a network address to the mobile device.

12. The wireless network of claim 10, further comprising a location service to determine the location of the mobile device.

13. The wireless network of claim 10, wherein the VoIP call agent provides control level communications with the mobile device.

14. The wireless network of claim 10, wherein the wireless network is a WiMAX Worldwide Interoperability for Microwave Access (WiMAX) network.

15. The wireless network of claim 10, wherein the emergency center is a public safety answering point (PSAP).

16. The wireless network of claim 10, wherein the mobile device discovers the VoIP call agent in the wireless network.

17. The wireless network of claim 10, wherein the call agent operates as an edge border of the VoIP infrastructure for the mobile device.

18. A system comprising:
a wireless service network including:
a VoIP (Voice over Internet Protocol) infrastructure, including a media gateway to connect to a public switched telephone network (PSTN) and a VoIP call agent,
an authentication server to authenticate a device certificate of a mobile device requesting emergency call services and to connect the mobile device to an emergency center via the public switched telephone network, wherein the mobile device has not been authenticated by the wireless service network when the emergency call services are requested, and
a location server to determine a location of the mobile device; and
an antenna for connection of the mobile device to the wireless service network;
wherein the system is to connect the mobile device to emergency services, the VoIP call agent choosing the emergency services based at least in part on the location of the mobile device, and wherein the system prevents the mobile device from utilizing network services other than emergency services.

19. The system of claim 18, wherein the wireless service network is a WiMAX (Worldwide Interoperability for Microwave Access) network.

20. The system of claim 18, wherein the mobile device discovers the VoIP call agent in the wireless service network.

* * * * *